(12) United States Patent
Flynn

(10) Patent No.: US 8,601,983 B2
(45) Date of Patent: Dec. 10, 2013

(54) DOG TRAINING DEVICE

(76) Inventor: James D. Flynn, Auburn, WA (US)

( * ) Notice: Subject to any disclaimer, the term of this patent is extended or adjusted under 35 U.S.C. 154(b) by 0 days.

(21) Appl. No.: 13/429,221

(22) Filed: Mar. 23, 2012

(65) Prior Publication Data

US 2012/0240867 A1    Sep. 27, 2012

Related U.S. Application Data

(60) Provisional application No. 61/466,785, filed on Mar. 23, 2011.

(51) Int. Cl.
*A01K 27/00*    (2006.01)
(52) U.S. Cl.
USPC ............................ 119/721; 119/769; 119/778
(58) Field of Classification Search
USPC ................. 119/721, 720, 725, 772, 778, 776
See application file for complete search history.

(56) References Cited

U.S. PATENT DOCUMENTS

| | | | | |
|---|---|---|---|---|
| 1,813,817 | A * | 7/1931 | Redfern | 119/424 |
| 2,821,169 | A * | 1/1958 | Barhorst | 119/776 |
| 2,889,095 | A * | 6/1959 | Heidecke et al. | 224/257 |
| 3,733,530 | A * | 5/1973 | Labart et al. | 318/16 |
| 3,807,330 | A * | 4/1974 | Ono et al. | 112/168 |
| 4,353,151 | A * | 10/1982 | Ennerdal | 24/641 |
| 4,562,625 | A * | 1/1986 | Doty et al. | 24/690 |
| 4,570,577 | A * | 2/1986 | Bellinger | 119/725 |
| 4,802,482 | A | 2/1989 | Gonda et al. | |
| 4,967,696 | A | 11/1990 | Tobias | |
| 5,029,651 | A * | 7/1991 | Ubbink | 175/19 |
| 6,725,810 | B2 * | 4/2004 | Schwartz | 119/720 |
| 6,874,447 | B1 | 4/2005 | Kobett | |
| 6,923,146 | B2 | 8/2005 | Kobitz et al. | |
| 7,328,671 | B2 | 2/2008 | Kates | |
| 7,814,865 | B2 | 10/2010 | Tracy et al. | |
| 2003/0145801 | A1 * | 8/2003 | DeBien | 119/772 |
| 2012/0247397 | A1 * | 10/2012 | Lvovskiy et al. | 119/720 |

* cited by examiner

*Primary Examiner* — Monica Williams
*Assistant Examiner* — Jessica Bowen
(74) *Attorney, Agent, or Firm* — Thomas E. Loop

(57) ABSTRACT

A novel dog training device for preventing a dog from breaking before the dog's trainer releases the dog to retrieve an object is disclosed herein. The dog training device comprises: a restraining strap for restraining the dog; a device body attachable to the ground; and a pin assembly that includes a releasable strap pin. The pin assembly is connected to the device body. The restraining strap is attached to the releasable strap pin and configured to loop around the dog. The releasable strap pin includes a catch configured to engage a movable latch positioned adjacent to the strap pin, and the movable latch is connected to an actuator configured to move the latch in a back and forth direction to thereby engage or disengage the latch from the catch. The actuator is activated by a remote control device.

5 Claims, 4 Drawing Sheets

DOG TRAINING DEVICE

CROSS-REFERENCE TO RELATED APPLICATIONS

This application claims the benefit of priority to U.S. Provisional Application No. 61/466,785 filed on Mar. 23, 2011, all of which application is incorporated herein by reference in its entirety for all purposes.

TECHNICAL FIELD

The present invention relates generally to dog training devices and, more specifically, to a dog training device that prevents a dog from breaking before a trainer releases the dog to retrieve.

BACKGROUND OF THE INVENTION

Training dogs to retrieve is often a long and difficult task, especially when the trainer is attempting to teach the dog to wait for a command before breaking to retrieve an object. It is common for a trainer to additionally desire to be some distance away from the dog when the command to retrieve is given and to teach the dog to sit patiently until hearing the verbal cue. When working with a dog alone it is often difficult to restrain the animal while teaching it to wait for a signal, especially from some distant location.

Although various remote dog training devices are known in the art, they all have various shortcomings with respect to properly restraining the dog while the dog waits for commands. Exemplary devices known in the art for remote dog training include:

U.S. Pat. No. 4,802,482 to Gonda discloses an animal training collar and portable transmitter that administers an electric shock via the collar to the animal when activated by the transmitter.

U.S. Pat. No. 4,967,696 to Tobias discloses a dog collar and transmitter unit that when activated allows the trainer to communicate from long distance to the dog via an audible sound. The emitted sound can either be a simple tone or a human voice.

U.S. Pat. No. 6,874,447 to Kobett discloses a dog collar and transmitter system that detects when the dog is a certain predetermined distance away from the transmitter and emits an unpleasant sound to keep the dog from going any further from its owner.

U.S. Pat. No. 6,923,146 to Kobitz discloses a collar and transmitter in which the collar receives and transmits Global Positioning Data (GPS) to the transmitter. The system has the ability to preset boundary limitations utilizing GPS location technology and when the dog leaves the boundary an electric pulse is administered.

U.S. Pat. No. 7,814,865 to Tracey discloses a collar and handheld transmitter that has the ability to transmit a locating signal from the collar to the transmitter and also transmit a training signal to the collar. The collar has a separate locating device and training device, and both communicate wirelessly to the transmitter.

U.S. Pat. No. 7,328,671 to Kates discloses a computer aided training and management system that uses a computer to wirelessly communicate with a dog collar and other dog interaction devices such as video monitors, loudspeakers, video cameras, training toys, treat and food dispensers, monitoring devices, and other accessories. This allows the owner to remotely control various activities with and for the dog.

Because each of these known devices has one or more shortcomings (especially in terms of providing a physical restraint while the dog waits for commands), there is still a need in the art for new and improved dog training devices. The present invention fulfills this need and provides for further related advantages.

SUMMARY OF THE INVENTION

The present invention in one embodiment is directed to a dog training device that comprises a dog restraining strap connected to a novel releasable pin assembly. The dog training device functions to prevent a dog from breaking before a trainer releases the dog to retrieve (a common problem associated with the training of bird dogs). In brief, the dog training device disclosed herein will keep the dog sitting until the trainer pushes a remote control button to trigger a solenoid that releases one end of the strap, which, in turn, releases the dog.

These and other aspects of the present invention will become more readily apparent to those possessing ordinary skill in the art when reference is made to the accompanying drawings in conjunction with the following detailed description.

BRIEF DESCRIPTION OF THE DRAWINGS

The drawings are intended to be illustrative of certain preferred embodiments of the present invention. Like reference numerals have been used to designate like features throughout the several views of the drawings.

DETAILED DESCRIPTION OF THE INVENTION

Figure 1:
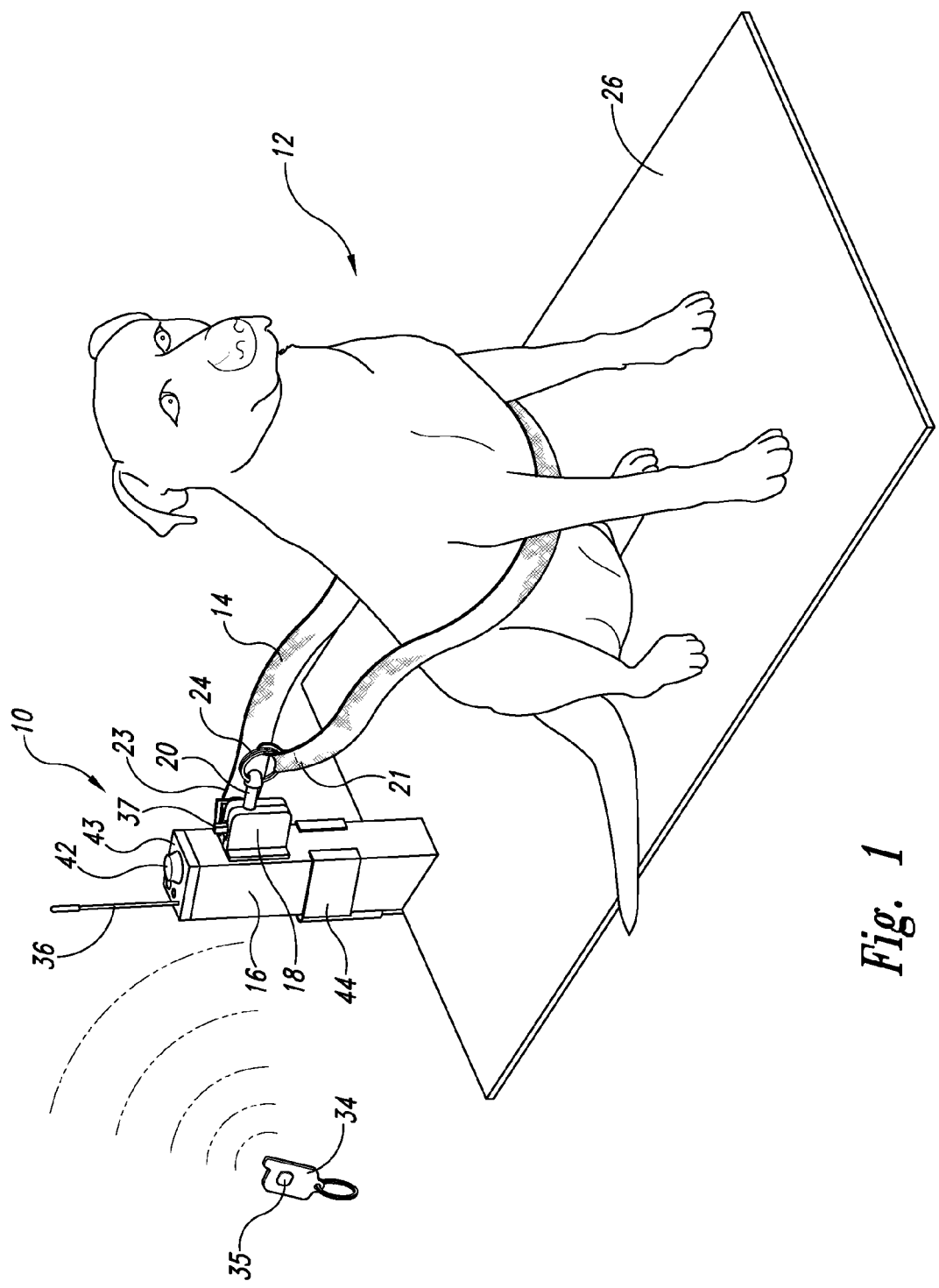
FIG. 1 is a perspective view of a dog training device in accordance with the present invention (and illustrates a dog being restrained while waiting to be released).
Figure 2:
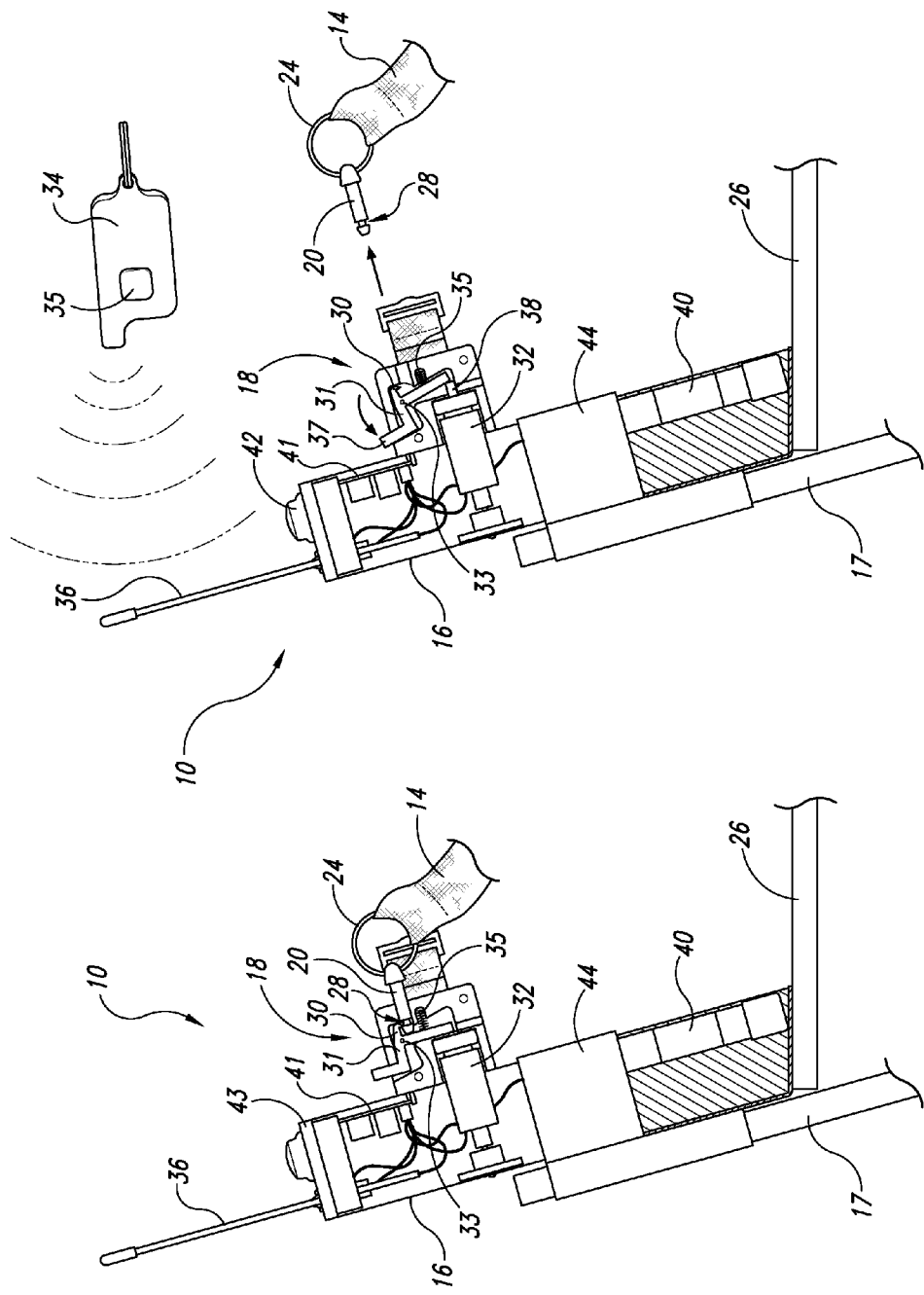
FIG. 2A is a side cross-sectional view of the dog training device shown in FIG. 1 (without the dog), wherein the releasable strap pin is engaged within the pin assembly with the movable latch in a forward position and engaged to the catch.
FIG. 2B is a side cross-sectional view of the dog training device shown in FIG. 1 (without the dog), wherein the releasable strap pin is disengaged from the pin assembly with the movable latch in a rearward position (initiated by remote activation of an actuator).

In the following detailed description, reference is made to the accompanying drawings, which form a part hereof. In the drawings, similar symbols or markings typically identify like or corresponding elements, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Accordingly, and in view of the foregoing and referring now to the drawings, and more particularly to FIGS. 1 through 4, the present invention is directed to a dog training device 10 for preventing a dog 12 from breaking before the dog's trainer (not shown) releases the dog to retrieve an object such as, for example, a bird. As best shown in FIG. 1, the dog training device 10 comprises an adjustable restraining strap 14 for restraining the dog 12 in a forward sitting position, a device body 16 attachable to the ground 15 (shown in FIG. 4) by way of a spike 17, and a pin assembly 18 that includes a releasable strap pin 20 with the pin assembly 18 being connected to the device body 16. The releasable strap pin 20 is attached at a proximal end 22 to the restraining strap 14 (attached by way of an interposing ring 24), and releasably attached to the pin assembly 18 at its distal end 26. As further shown, the restraining strap 14 is attached to the releasable strap pin 20 at one end 21 and to the device body 16 at its other end 23. The restraining strap 14 is configured to loop around the dog's chest and restrain the dog 12 in a forward sitting position. In some embodiments, the dog training device 10 also includes a dog mat 26.

Figure 3:
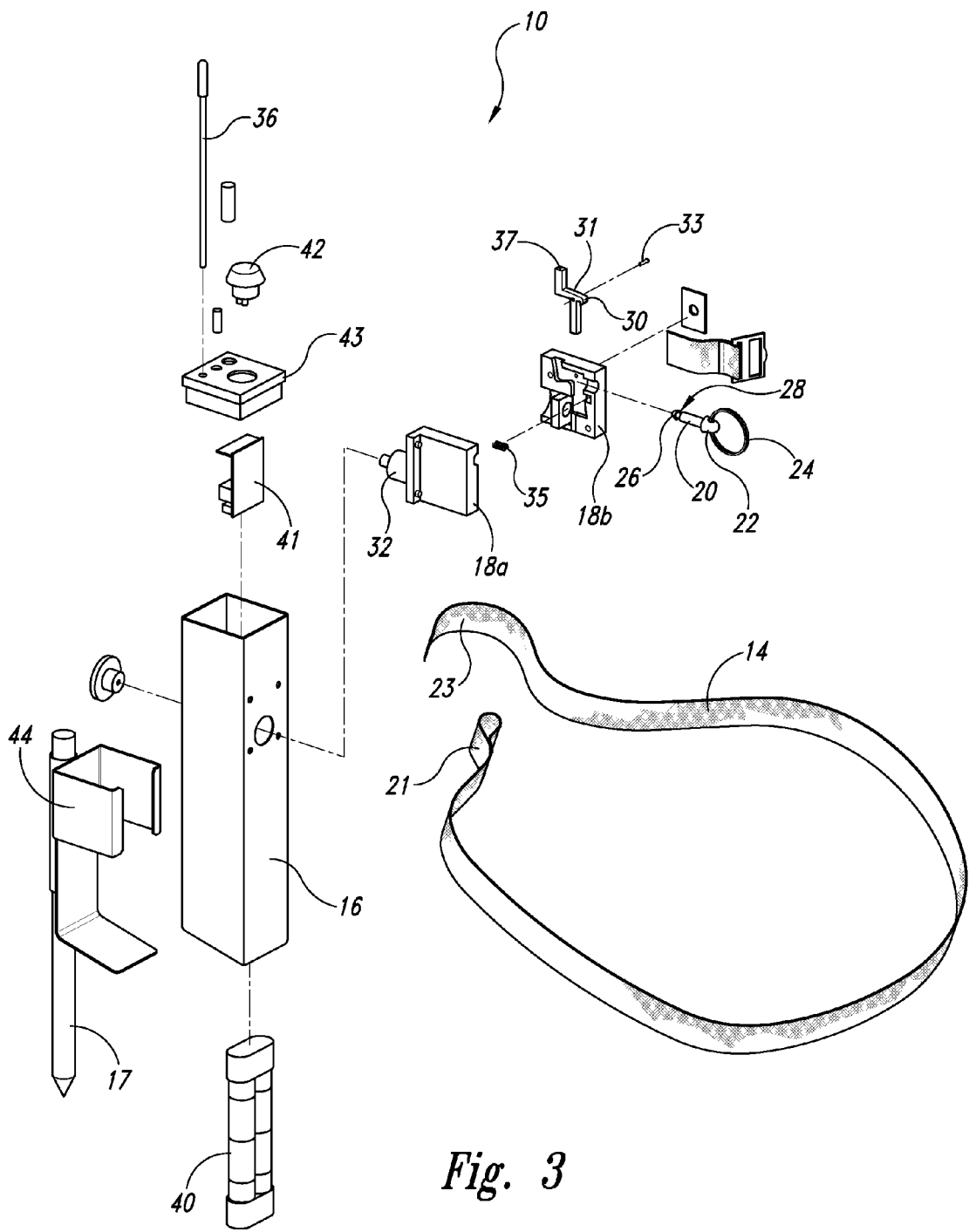
FIG. 3 is an exploded perspective view of the dog training device shown in FIG. 1 detailing various parts and their interrelation with one another.
Figure 4:
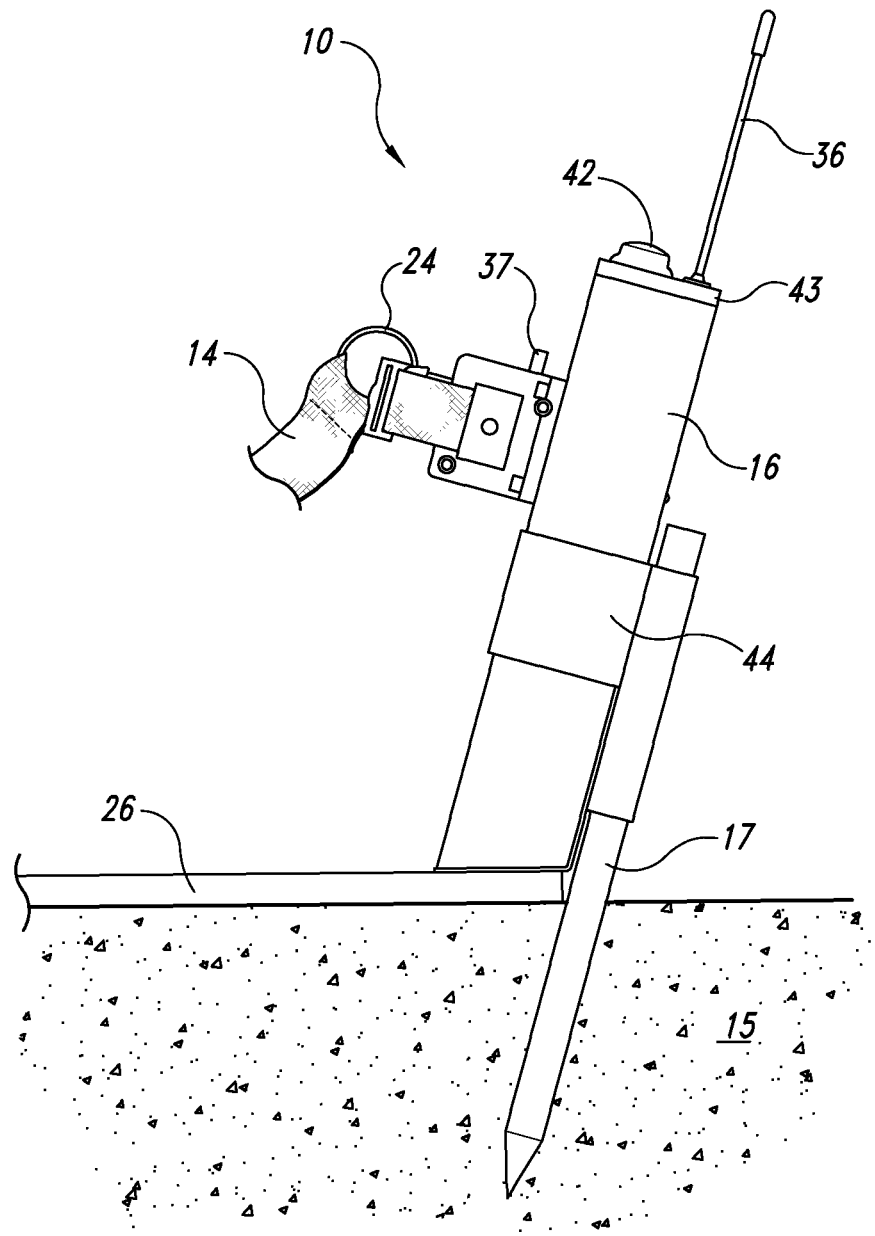
FIG. 4 is a side view of the dog training device shown in FIG. 1, wherein the dog training device is attached to the ground by a spike.

As best shown in FIGS. 2A and 2B, the releasable strap pin 20 includes a catch 28 configured to engage a movable latch 30. The latch 30 is centrally positioned on a lever 31 positioned within the pin assembly 18 and adjacent to the strap pin 20 (with the pin assembly 18 being composed of pin assembly housing components 18a, 18b as shown in FIG. 3). The lever 31 is connected to an actuator 32 at its lower end. The lever 31 has a centrally positioned pivot 33 that enables the lever 31 to move in a back and forth direction to thereby engage or disengage the latch 30 from the catch 28. As shown, a spring 35 is also contained within the pin assembly 18 and positioned adjacent to the lever 31 to thereby urge the movable latch 30 back into the catch 28 (when the actuator is deactivated). The lever 31 also includes a release 37 at its upper end that protrudes out from the pin assembly 18. The release 37 enables the trainer to manually disengage the strap pin 20 from the pin assembly 18 (by pushing the lever 31 rearward towards the device body 16).

As best shown in FIG. 3, the releasable strap pin 20 is preferably in the shape of a rod and the catch 28 is preferably in the form of a circular groove positioned on the distal end 26 of the rod. As further shown, the actuator 32 is activated by a remote control device 34 having a button 35 (that when pushed by the trainer sends a signal that is received by an antenna 36 that, in turn, is electrically connected to the actuator 32). The actuator 32 is preferably a solenoid having an extendable push rod 38 configured to push against the lower end of the lever 31. Thus, and in this configuration, the dog training device 10 will keep the dog 12 sitting until the trainer pushes the remote control button 35 to trigger the solenoid that extends the push rod 38 (shown in FIG. 2B) that moves the lever 31 about its pivot 33 (so as to disengage the latch 30 from the catch 28) and releases the strap pin 20 from the pin assembly 18 (connected at one end 21 of the strap 14), which, in turn, releases the dog 12. The releasing of the strap pin 20 from the pin assembly 18 makes a "clicking" sound, and the dog 12 soon learns that the clicking sound means that he/she is free to go. Preferably, the trainer releases the dog by saying a release command while at the same time pushing the remote control button 35.

As also best shown in FIG. 3, the dog training device 10 of the present invention also includes a rechargeable battery 40 electrically connected to the actuator 32 (for supplying electrical power) and a motherboard 41 (for controlling electrical signals to and from the remote control device 34, the battery 40, and the actuator 32) and an "on-off" button 42 (positioned on a cap 43 fitted on top of the device body 16). The dog training device 10 further includes a ground bracket 44 engaged about the device body 16 (for securing the device body 16 to the ground 15 by way of the spike 17).

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A dog training device for preventing a dog from breaking before the dog's trainer releases the dog to retrieve an object, comprising:
    a restraining strap for restraining the dog;
    a device body attachable to the ground; and
    a pin assembly that includes a releasable strap pin, wherein the pin assembly is connected to the device body, and wherein the restraining strap is attached to the releasable strap pin and configured to loop around the dog, and wherein the releasable strap pin includes a catch configured to engage a movable latch positioned adjacent to the strap pin, and wherein the movable latch is connected to an actuator configured to move the latch in a back and forth direction to thereby engage or disengage the latch from the catch, and wherein the releasable strap pin is in the shape of a rod and the catch is in the form of a circular groove positioned on a distal end of the rod; and
    a lever positioned within the pin assembly and adjacent to the strap pin, wherein the lever has a centrally positioned pivot that enable the lever to move in back and forth directions to thereby engage or disengage the latch from the catch.

2. The dog training device according to claim 1 wherein the actuator is activated by a remote control device.

3. The dog training device according to claim 2 wherein the device body is attachable to the ground by a spike.

4. The dog training device according to claim 1, further comprising a spring contained with the pin assembly and positioned adjacent to the lever to thereby urge the movable latch back into the catch when the actuator is deactivated.

5. The dog training device according to claim 4 wherein the actuator is a solenoid having an extendable push rod configured to push against the lower end of the lever.

\* \* \* \* \*